(12) United States Patent
Hanson

(10) Patent No.: US 12,179,831 B1
(45) Date of Patent: Dec. 31, 2024

(54) BENDABLE STEERING SHAFT

(71) Applicant: Jacob Hanson, Milbank, SD (US)

(72) Inventor: Jacob Hanson, Milbank, SD (US)

( * ) Notice: Subject to any disclaimer, the term of this patent is extended or adjusted under 35 U.S.C. 154(b) by 0 days.

(21) Appl. No.: 18/231,618

(22) Filed: Aug. 8, 2023

(51) Int. Cl.
| | | |
|---|---|---|
| *B62D 1/10* | (2006.01) | |
| *B62D 1/16* | (2006.01) | |
| *F16C 1/08* | (2006.01) | |
| *F16D 3/16* | (2006.01) | |

(52) U.S. Cl.
CPC .............. *B62D 1/10* (2013.01); *B62D 1/16* (2013.01); *F16C 1/08* (2013.01); *F16D 3/16* (2013.01)

(58) Field of Classification Search
CPC . B62D 1/10; B62D 1/16; B62D 1/184; B62D 1/185; B62D 1/19; B62D 1/192; B62D 1/195; B62D 1/197; F16C 1/08; F16D 3/16
USPC ...................................... 74/492, 493
See application file for complete search history.

(56) References Cited

U.S. PATENT DOCUMENTS

| | | | | | |
|---|---|---|---|---|---|
| 225,516 | A | * | 3/1880 | Gates | ............... F16C 1/06 464/53 |
| 3,434,369 | A | * | 3/1969 | Runkle | ............... B62D 1/192 464/167 |
| 3,600,969 | A | * | 8/1971 | Pitner | ............... F16D 3/385 464/131 |
| 3,724,286 | A | * | 4/1973 | Kitzner | ............... B62D 1/195 74/492 |
| 3,797,601 | A | * | 3/1974 | Barenyi | ............... B60R 21/045 296/70 |
| 5,853,194 | A | * | 12/1998 | Baker | ............... B62D 1/192 74/492 |
| 6,223,619 | B1 | | 5/2001 | Shibata | |
| 6,612,198 | B2 | * | 9/2003 | Rouleau | ............... B62D 1/181 280/775 |
| 8,157,659 | B2 | | 4/2012 | Kakutani | |
| 9,162,702 | B2 | | 10/2015 | Read | |
| 10,035,534 | B2 | | 7/2018 | Jager | |
| 2008/0314190 | A1 | | 12/2008 | Miyawaki | |
| 2009/0095114 | A1 | * | 4/2009 | Ridgway | ............... B62D 1/184 74/493 |
| 2018/0292044 | A1 | * | 10/2018 | Heidel | ............... F16P 1/02 |
| 2022/0063701 | A1 | * | 3/2022 | Partyka | ............... F16D 3/78 |

FOREIGN PATENT DOCUMENTS

| | | | | | |
|---|---|---|---|---|---|
| CN | 107207031 | A | * | 9/2017 | ............... B62D 1/16 |
| CN | 117561194 | A | * | 2/2024 | ......... B60H 1/00292 |
| DE | 10125328 | A1 | * | 1/2002 | ........... B60N 2/0232 |
| EP | 1512607 | | | 3/2005 | |
| FR | 3087409 | A1 | * | 4/2020 | ............. B62D 1/163 |

OTHER PUBLICATIONS

Description Translation for DE 10125328 from Espacenet (Year: 2002).*

* cited by examiner

*Primary Examiner* — Jason D Shanske
*Assistant Examiner* — Daniel M. Keck

(57) ABSTRACT

A steering shaft apparatus for transferring a torque from a steering wheel to a steering gearbox while adapting to obstructions and movement of the steering gearbox relative to the steering wheel includes a rigid shaft and a flexible shaft. The rigid shaft connects to the steering wheel and the flexible shaft connects to an input of the steering gearbox. A torque applied to the steering wheel is transferred through the rigid shaft and the flexible shaft to the input. The flexible shaft bends as needed while continuing to serve to transfer the torque.

10 Claims, 5 Drawing Sheets

BENDABLE STEERING SHAFT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to steering shaft and more particularly pertains to a new steering shaft for transferring a torque from a steering wheel to a steering gearbox while adapting to obstructions and movement of the steering gearbox relative to the steering wheel.

(2) Description of Related Art Including Information Disclosed Under 37 CFR 1.97 and 1.98

The prior art describes various steering shafts which telescope to move a steering wheel toward or away from the steering gearbox. But the prior art fails to describe a steering shaft which bends to adapt to obstructions and movement of a steering gearbox relative to the steering wheel. While useful for any automobile, such a steering shaft is particularly advantageous for automobiles which participate in demolition derbies or other competitions in which continued operation of the automobile after a collision is desirable. Collisions will often result in the steering gearbox being moved with respect to the steering wheel, causing a traditional rigid steering shaft to plastically bend or catastrophically fracture, disabling steering of the automobile. Another potential outcome of such collisions is the introduction of an obstruction which impacts the steering shaft. In either case, a flexible steering shaft would permit continued steering of the automobile which is not possible for traditional, rigid steering shafts.

BRIEF SUMMARY OF THE INVENTION

An embodiment of the disclosure meets the needs presented above by generally comprising a rigid shaft which is elongated between a first end and a second end. A flexible shaft is coupled to the rigid shaft such that a rotation of the rigid shaft about the central longitudinal axis of the rigid shaft urges the flexible shaft to rotate about a central longitudinal axis of the flexible shaft. The flexible shaft is elongated between a proximal end and a distal end relative to the rigid shaft and extends away from the second end of the rigid shaft. The flexible shaft comprises a flexible material such that the flexible shaft is bendable along the central longitudinal axis of the flexible shaft. The flexible shaft is also rotatable about the central longitudinal axis of the flexible shaft when the central longitudinal axis of the flexible shaft is positioned in a non-linear orientation.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
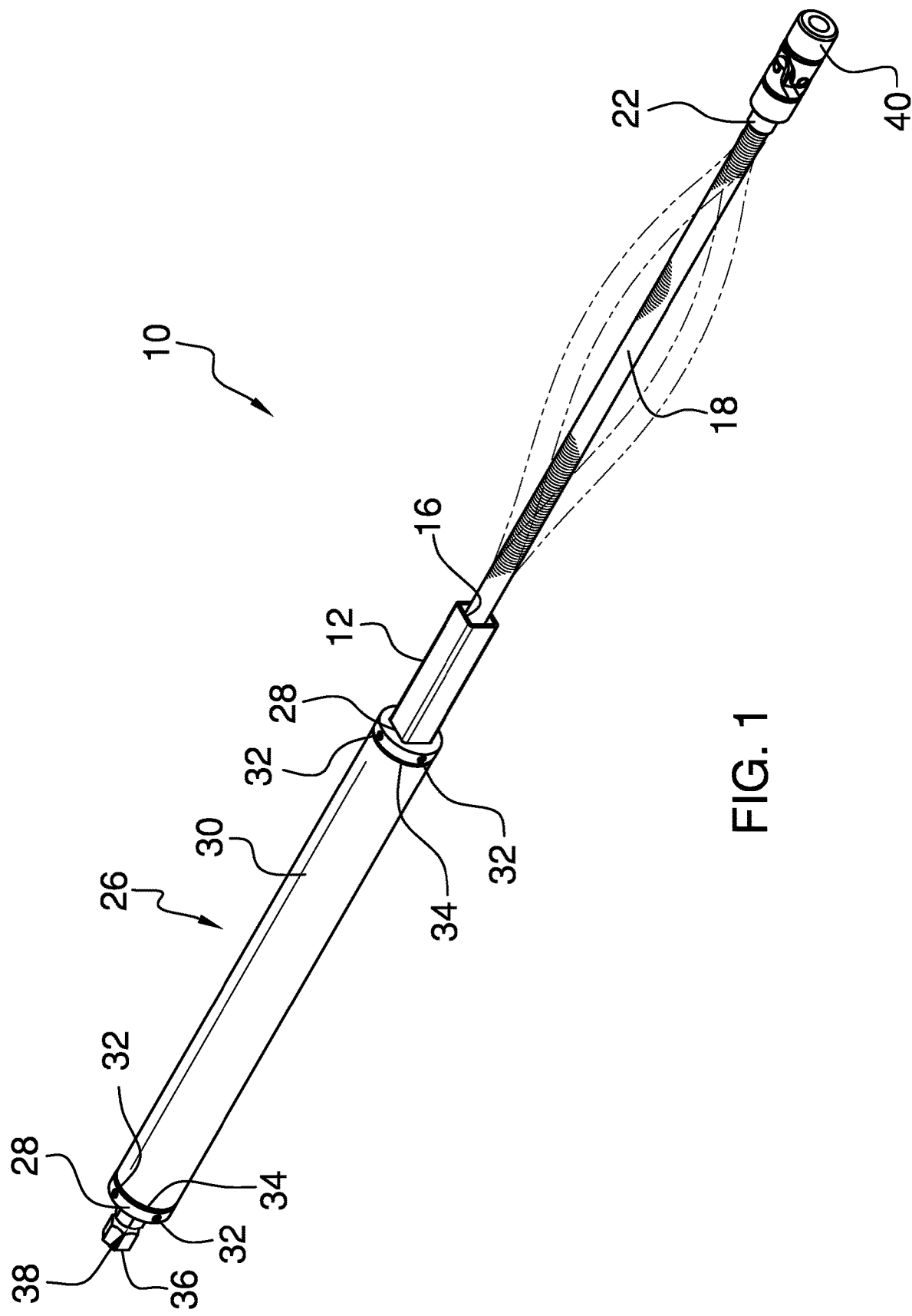
FIG. 1 is a perspective view of a steering shaft apparatus according to an embodiment of the disclosure.
Figure 2:
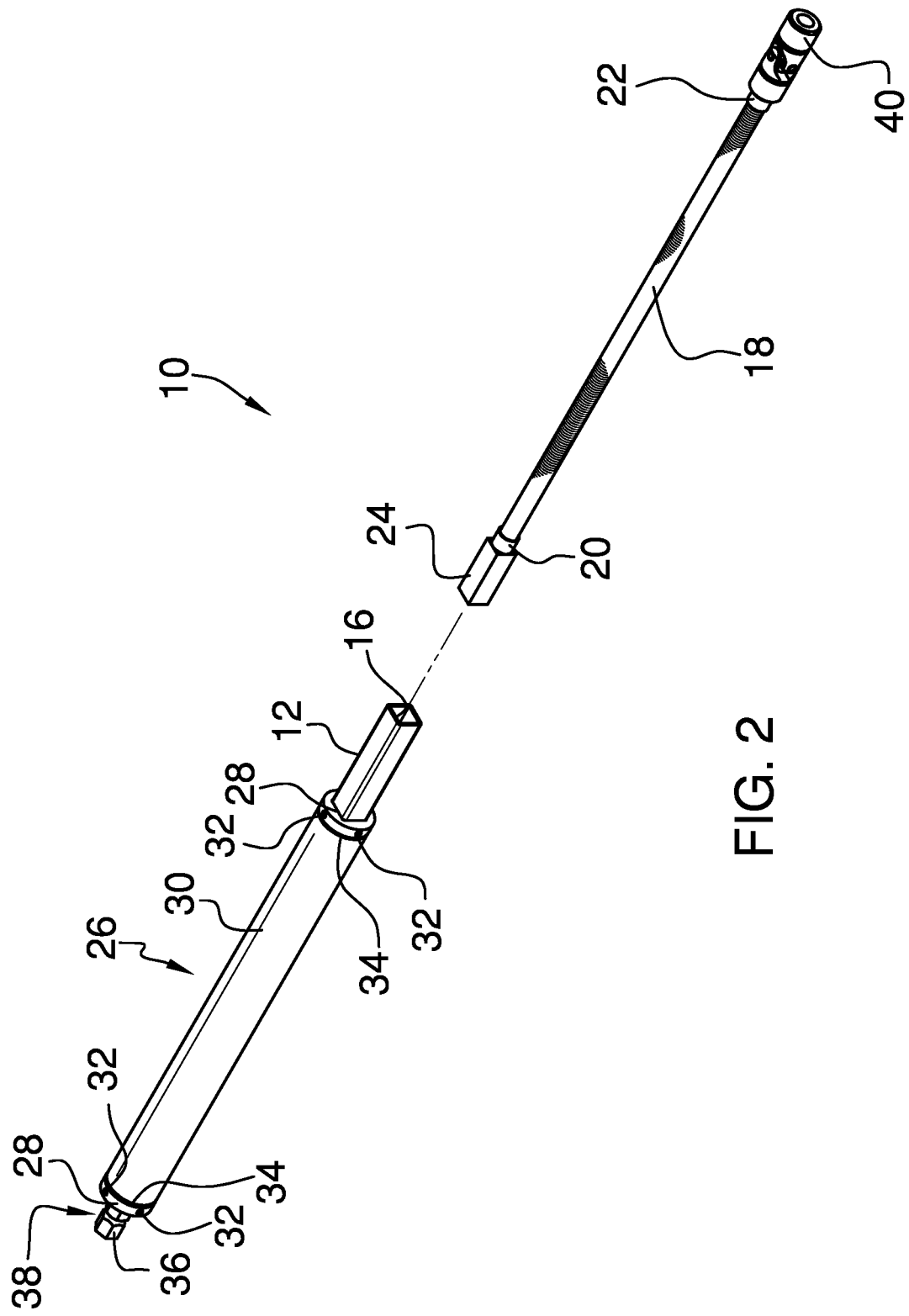
FIG. 2 is an exploded perspective view of an embodiment of the disclosure.
Figure 3:
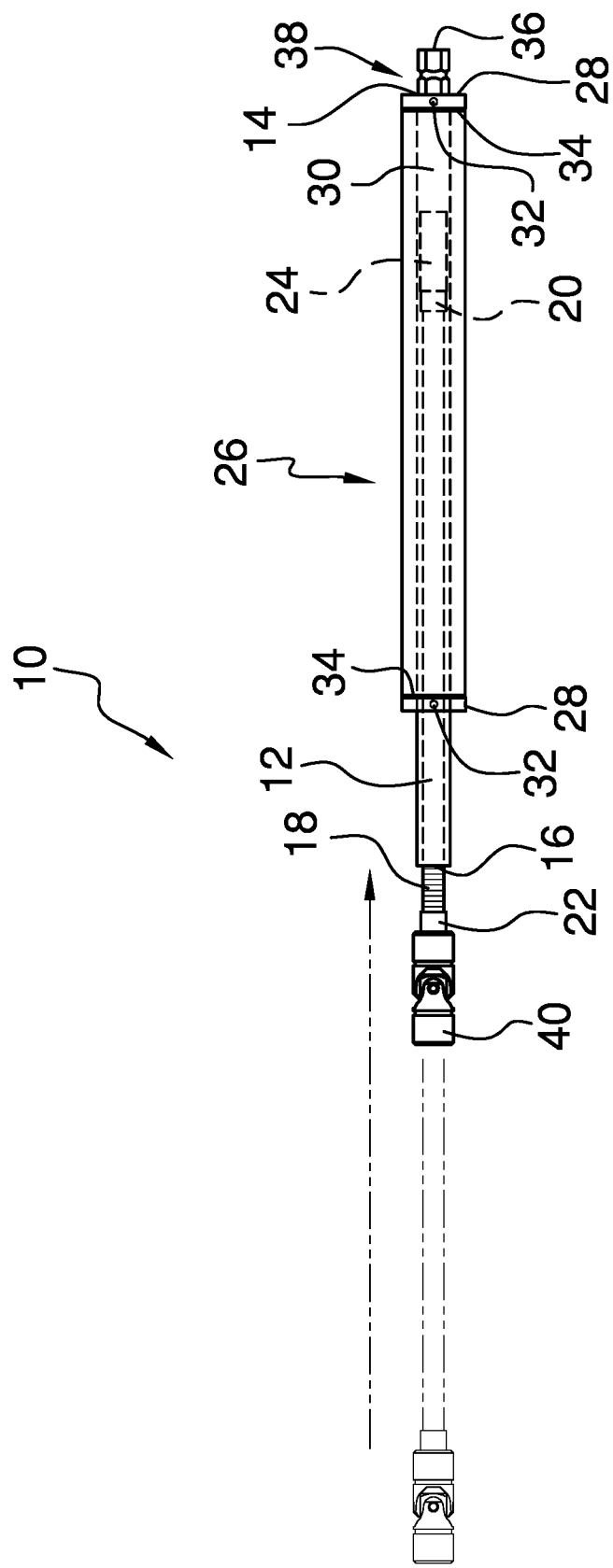
FIG. 3 is a side view of an embodiment of the disclosure.
Figure 4:
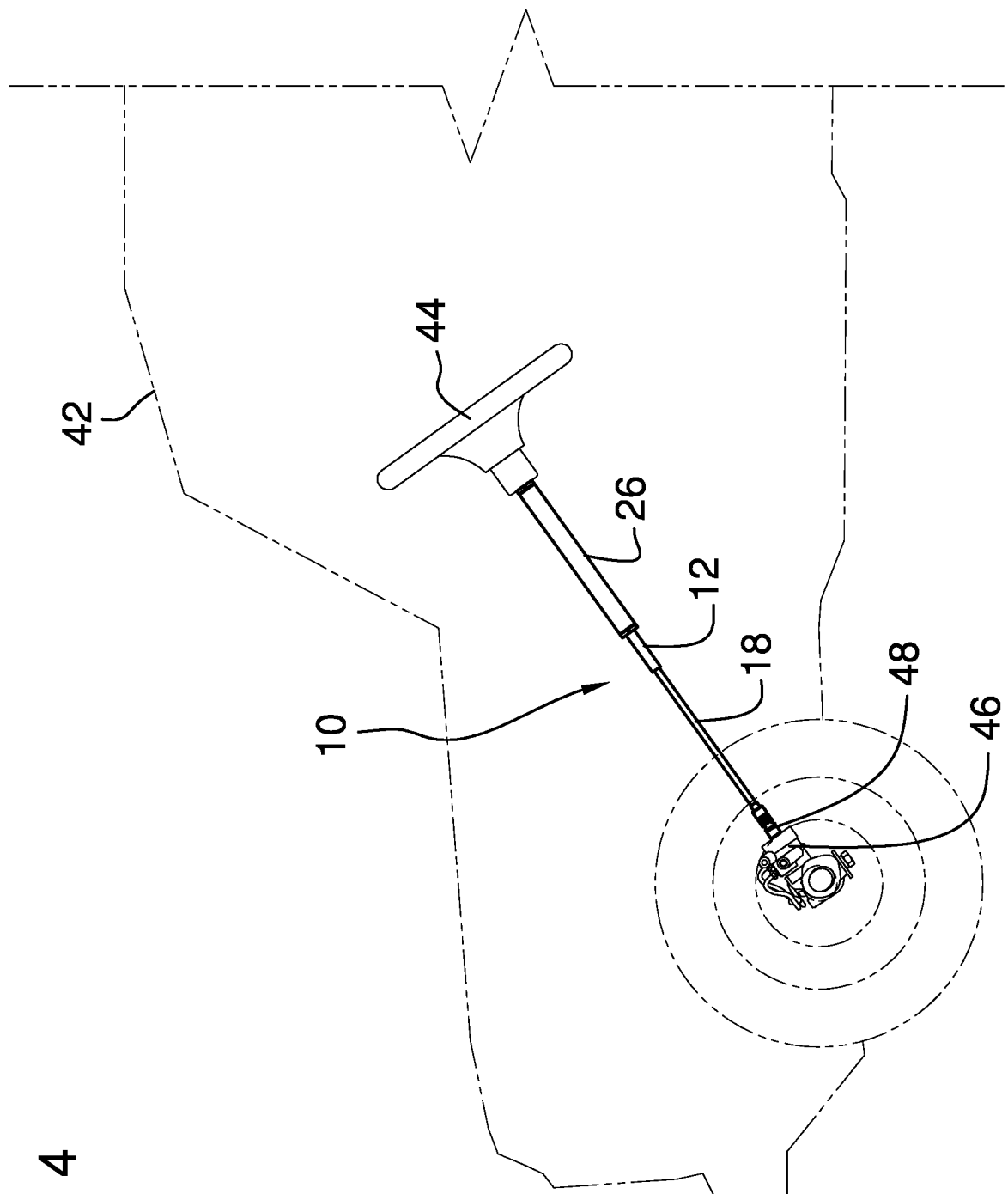
FIG. 4 is an in-use view of an embodiment of the disclosure.
Figure 5:
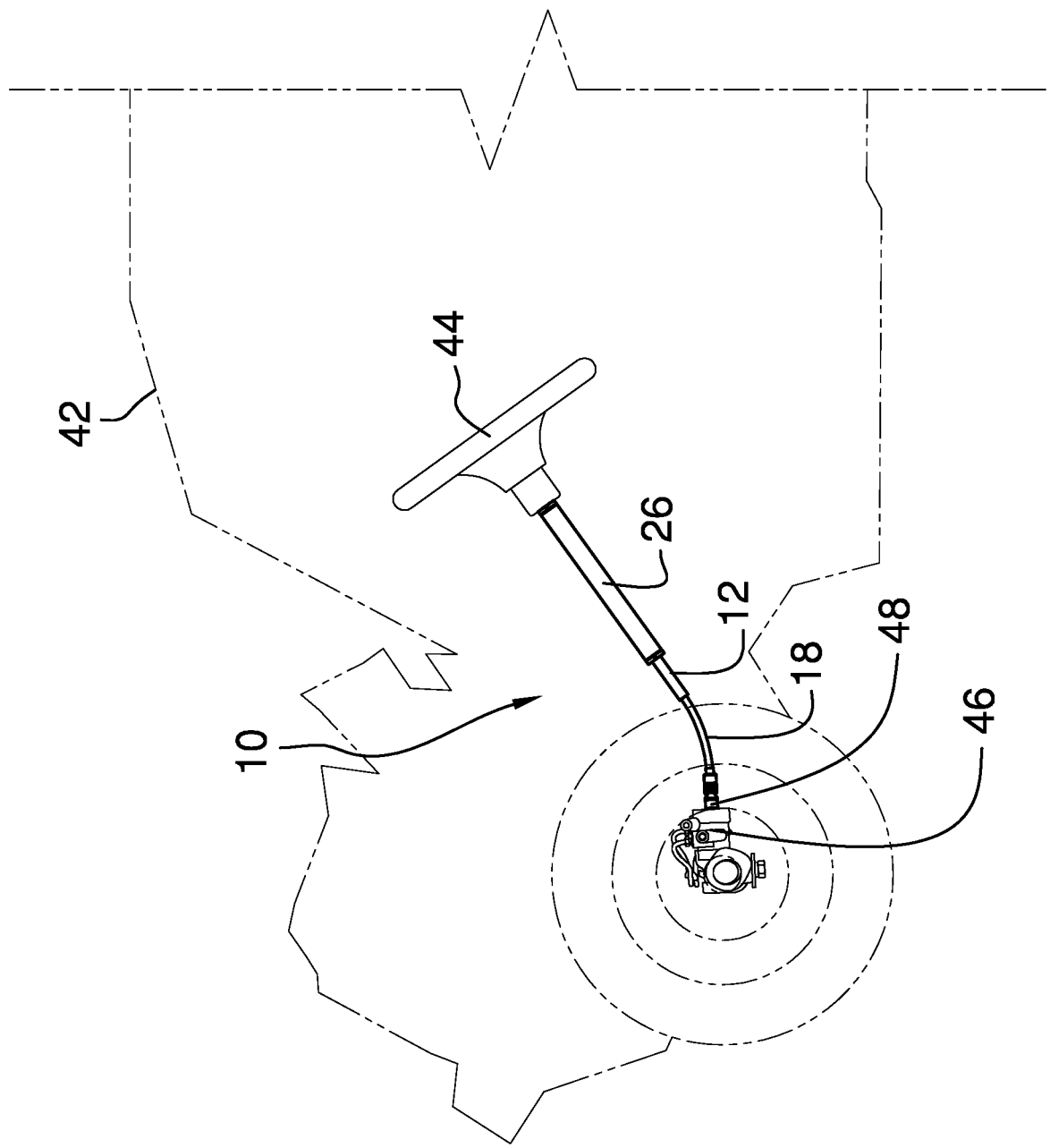
FIG. 5 is an in-use view of an embodiment of the disclosure.

With reference now to the drawings, and in particular to FIGS. 1 through 5 thereof, a new steering shaft embodying the principles and concepts of an embodiment of the disclosure and generally designated by the reference numeral 10 will be described.

As best illustrated in FIGS. 1 through 5, the steering shaft apparatus 10 generally comprises a rigid shaft 12 which is elongated between a first end 14 and a second end 16. A flexible shaft 18 is coupled to the rigid shaft 12 such that a rotation of the rigid shaft 12 about a central longitudinal axis of the rigid shaft 12 urges the flexible shaft 18 to rotate about a central longitudinal axis of the flexible shaft 18. The flexible shaft 18 is elongated between a proximal end 20 and a distal end 22 relative to the rigid shaft 12 and extends away from the second end 16 of the rigid shaft 12. The flexible shaft 18 comprises a flexible material such that the flexible shaft 18 is bendable along the central longitudinal axis of the flexible shaft 18. The flexible shaft 18 is also rotatable about the central longitudinal axis of the flexible shaft 18 when the central longitudinal axis of the flexible shaft 18 is positioned in a non-linear orientation. The flexible material comprises a cable but may comprise any suitably flexible material. The rigid shaft 12 comprises a rigid material such that the rigid shaft 12 may securely mount to an automobile 42.

The flexible shaft 18 is slidably coupled to the rigid shaft 12 such that a full shaft length from the first end 14 of the rigid shaft 12 to the distal end 22 of the flexible shaft 18 is adjustable. The rigid shaft 12 has a tubular shape, and a cross section of the rigid shaft 12 taken perpendicular to the central longitudinal axis of the rigid shaft 12 has a square shape. An insert 24 is coupled to the proximal end 20 of the flexible shaft 18 and is positioned in the rigid shaft 12. The insert 24 has an exterior complementary in shape to an interior of the rigid shaft 12. In other embodiments, the rigid shaft 12, the flexible shaft 18, and the insert 24 may have other suitable shapes which facilitate both an adjustment in the full shaft length and a rotation of the flexible shaft 18 via a rotation of the rigid shaft 12. For example, the rigid shaft 12 and the insert 24 may have a hexagonal cross section, an elliptical cross section, or the like. The rigid shaft 12 and the insert 24 also may have interlocking splines. The insert 24 and the flexible shaft 18 may be integrally formed. The flexible shaft 18 may receive the rigid shaft 12 therein.

A bearing assembly 26 is coupled to the rigid shaft 12. The bearing assembly 26 comprises a pair of collars 28 and an outer tube 30. The collars 28 are coupled to the rigid shaft 12, and the outer tube 30 is rotatably coupled to and extends between the pair of collars 28. The outer tube 30 may then be fixedly secured to the automobile 42. The collars 28 may be secured to the rigid shaft 12 via a plurality of set screws 32 which extend through the collars 28 and engage the rigid shaft 12 to retain the rigid shaft 12 to the pair of collars 28. Bushings 34 may also be placed around the rigid shaft 12 and between the collars 28 and the outer tube 30 to facilitate rotation of the rigid shaft 12 within the outer tube 30.

A steering wheel connector 36 is coupled to and extends away from the first end 14 of the rigid shaft 12 and has a neck 38 configured for connecting to a steering wheel 44 via a snap fit. A cross section of the steering wheel connector 36 has a hexagonal shape. Other means of connecting a steering wheel 44 to the rigid shaft 12 may also be employed, including threaded fasteners, clips, latches, clamps, or the like. The steering wheel connector 36 also may have a square cross section, an elliptical cross section, or other suitable cross-sections for urging the rigid shaft 12 to rotate by rotating the steering wheel 44 when the steering wheel 44 is connected to the rigid shaft 12. The steering wheel connector 36 may also have splines.

A universal joint 40 is coupled to the distal end 22 of the flexible shaft 18 and may be attached to an input 48 of a steering gearbox 46 of the automobile 42 via a weldment, a socket connection, a force fit, or the like. In some embodiments, the flexible shaft 18 may be directly connected to the input 48 of the steering gearbox 46 via a weldment, a socket connection, a force fit, or the like.

In use, the steering shaft apparatus 10 connects the steering wheel 44 to the input 48 of the steering gearbox 46 to transfer a torque exerted on the steering wheel 44 to the input 48. The flexible shaft 18 is adapted to bend when the steering gearbox 46 moves with respect to the steering wheel 44 or an obstruction impinges upon the flexible shaft 18, both of which may occur, for example, in the event of a collision of the automobile 42. Following such a collision, the steering shaft apparatus 10 continues to permit the transfer of the torque from the steering wheel 44 to the input 48 of the steering gearbox 46, avoiding significant disablement to the operation of the automobile 42.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A steering shaft apparatus for an automobile, the apparatus comprising:
   a rigid shaft being elongated between a first end and a second end; and
   a flexible shaft being coupled to the rigid shaft such that a rotation of the rigid shaft about a central longitudinal axis of the rigid shaft urges the flexible shaft to rotate about a central longitudinal axis of the flexible shaft, the flexible shaft being elongated between a proximal end and a distal end relative to the rigid shaft, the flexible shaft extending away from the second end of the rigid shaft, the flexible shaft comprising a flexible material such that the flexible shaft is bendable along the central longitudinal axis of the flexible shaft, the flexible shaft being rotatable about the central longitudinal axis of the flexible shaft when the central longitudinal axis of the flexible shaft is positioned in a non-linear orientation, wherein the flexible shaft is slidably coupled to the rigid shaft such that a full shaft length from the first end of the rigid shaft to the distal end of the flexible shaft is adjustable.

2. The apparatus of claim 1, wherein the flexible material comprises a cable.

3. The apparatus of claim 1, wherein the rigid shaft has a tubular shape, and further comprising an insert being coupled to the proximal end of the flexible shaft and being positioned in the rigid shaft, the insert having an exterior complementary in shape to an interior of the rigid shaft.

4. The apparatus of claim 3, wherein a cross section of the rigid shaft taken perpendicular to the central longitudinal axis of the rigid shaft has a square shape.

5. The apparatus of claim 1, further comprising a bearing assembly being coupled to the rigid shaft, the bearing assembly comprising:
   a pair of collars being coupled to the rigid shaft; and
   an outer tube being rotatably coupled to and extending between the pair of collars.

6. The apparatus of claim 1, further comprising a steering wheel connector being coupled to and extending away from the first end of the rigid shaft, the steering wheel connector having a neck configured for connecting to a steering wheel via a snap fit.

7. The apparatus of claim 6, wherein a cross section of the steering wheel connector has a hexagonal shape.

8. The apparatus of claim 1, further comprising a universal joint being coupled to the distal end of the flexible shaft.

9. A steering shaft apparatus for an automobile, the apparatus comprising:
- a rigid shaft being elongated between a first end and a second end; and
- a flexible shaft being coupled to the rigid shaft such that a rotation of the rigid shaft about a central longitudinal axis of the rigid shaft urges the flexible shaft to rotate about a central longitudinal axis of the flexible shaft, the flexible shaft being elongated between a proximal end and a distal end relative to the rigid shaft, the flexible shaft extending away from the second end of the rigid shaft, the flexible shaft comprising a flexible material such that the flexible shaft is bendable along the central longitudinal axis of the flexible shaft, the flexible shaft being rotatable about the central longitudinal axis of the flexible shaft when the central longitudinal axis of the flexible shaft is positioned in a non-linear orientation; and
- a bearing assembly being coupled to the rigid shaft, the bearing assembly comprising:
  - a pair of collars being coupled to the rigid shaft,
  - an outer tube being rotatably coupled to and extending between the pair of collars, and
  - wherein the bearing assembly further comprises a plurality of set screws, each set screw of the plurality of set screws being coupled to an associated collar of the pair of collars and engaging the rigid shaft to retain the associated collar to the rigid shaft.

10. A steering shaft apparatus for an automobile, the apparatus comprising:
- a rigid shaft being elongated between a first end and a second end, the rigid shaft having a tubular shape, a cross section of the rigid shaft taken perpendicular to a central longitudinal axis of the rigid shaft having a square shape;
- a flexible shaft being coupled to the rigid shaft such that a rotation of the rigid shaft about the central longitudinal axis of the rigid shaft urges the flexible shaft to rotate about a central longitudinal axis of the flexible shaft, the flexible shaft being elongated between a proximal end and a distal end relative to the rigid shaft, the flexible shaft extending away from the second end of the rigid shaft, the flexible shaft comprising a flexible material such that the flexible shaft is bendable along the central longitudinal axis of the flexible shaft, the flexible shaft being rotatable about the central longitudinal axis of the flexible shaft when the central longitudinal axis of the flexible shaft is positioned in a non-linear orientation, the flexible material comprising a cable, the flexible shaft being slidably coupled to the rigid shaft such that a full shaft length from the first end of the rigid shaft to the distal end of the flexible shaft is adjustable;
- an insert being coupled to the proximal end of the flexible shaft and being positioned in the rigid shaft, the insert having an exterior complementary in shape to an interior of the rigid shaft;
- a bearing assembly being coupled to the rigid shaft, the bearing assembly comprising:
  - a pair of collars being coupled to the rigid shaft;
  - an outer tube being rotatably coupled to and extending between the pair of collars; and
  - a plurality of set screws, each set screw of the plurality of set screws being coupled to an associated collar of the pair of collars and engaging the rigid shaft to retain the associated collar to the rigid shaft;
- a steering wheel connector being coupled to and extending away from the first end of the rigid shaft, the steering wheel connector having a neck configured for connecting to a steering wheel via a snap fit, a cross section of the steering wheel connector having a hexagonal shape; and
- a universal joint being coupled to the distal end of the flexible shaft.

\* \* \* \* \*